United States Patent [19]
Graf et al.

[11] Patent Number: 5,830,817
[45] Date of Patent: Nov. 3, 1998

[54] ACCELERATOR COMBINATIONS

[75] Inventors: Hans-Joachim Graf, Stratford, Canada; Volker Schäfer, Altrip, Germany; Hartmut Schulz, Heidelberg, Germany; Erich Schmidt, Bürstadt, Germany; Hans-Martin Issel, Shinmachi, Japan; Hans-Dieter Voss, Brühl, Germany; Harald Kleinknecht, Alzey, Germany; Manfred Schweiger, Bürstadt, Germany

[73] Assignee: Rhein Chemie Rheinau GmbH, Mannheim, Germany

[21] Appl. No.: 782,662

[22] Filed: Jan. 14, 1997

Related U.S. Application Data

[63] Continuation-in-part of Ser. No. 496,311, Jun. 29, 1995, abandoned.

[30] Foreign Application Priority Data

Jul. 13, 1994 [DE] Germany ............................ 44 24 681.1

[51] Int. Cl.⁶ .................................................... C08C 19/20
[52] U.S. Cl. ...................... 502/167; 502/162; 525/332.6; 525/332.7; 525/341; 525/346; 525/349; 525/351; 525/352; 525/370

[58] Field of Search .............................. 525/332.5, 332.6, 525/332.7, 331.8, 330.9, 336.1, 351, 352, 349, 370, 341, 346; 502/162, 167; 252/182.13, 182.17, 182.28, 182.3

[56] References Cited

U.S. PATENT DOCUMENTS

| | | | |
|---|---|---|---|
| 2,063,629 | 4/1936 | Salzberg et al. ..................... | 525/341 X |
| 2,879,243 | 3/1959 | Anderson ............................. | 525/341 X |
| 4,803,250 | 2/1989 | Nagasaki et al. .................... | 525/341 X |

OTHER PUBLICATIONS

Rubber Technology, 3rd ed., Van Nostrand Reinhold, N.Y., pp. 20, 44–46 (1987).

*Primary Examiner*—Fred Teskin
*Attorney, Agent, or Firm*—Connolly & Hutz

[57] ABSTRACT

A vulcanization accelerator combination based on di-($C_6$–$C_{12}$ alkyl)dithiophosphates for vulcanizing non-polar rubbers, comprising the following components: (a) a di-($C_6$–$C_{12}$ alkyl)dithiophosphate; (b) one or more compounds selected from the group consisting of sulphenamides, thiazoles and carbamates; (c) sulfur and/or a sulfur donor; and (d) at least one additional accelerator compound having a specific chemical structure that is different from the chemical structure of component (a) and any of the compounds used as component (b) in said accelerator combination.

18 Claims, No Drawings

ACCELERATOR COMBINATIONS

CROSS-REFERENCE TO RELATED APPLICATION

This application is a continuation-in-part of U.S. patent application Ser. No. 08/496,311 filed on Jun. 29, 1995, in the names of Hans-Joachim Graf et al, now abandoned.

BACKGROUND OF THE INVENTION

Rubbers containing double bonds in their main or side chains may be crosslinked with sulfur or sulfur donors. Any further mention of sulfur below always also includes other sulfur donors. The crosslinking process is also known as vulcanization. In this process, the sulfur (or sulfur donor) is used together with a vulcanization accelerator. These accelerators may consist of a single chemical or of two or more chemicals.

The quantity of vulcanization accelerator in relation to the sulfur and simultaneously in relation to the quantity of double bonds in the rubber used determines the crosslinking rate and the network structure. This in turn determines the physical properties and aging resistance of the vulcanizate.

Determining the necessary quantity of accelerator for non-polar rubbers, for example EPDM rubber, is particularly problematic. In order to achieve satisfactory vulcanizate properties, it was hitherto necessary to select such a large quantity of accelerator that its solubility limit was exceeded. This results in blooming, the dynamic resistance of vulcanizate moldings is inter alia impaired.

Most chemicals which are used in customary accelerators lead to the formation of N-nitrosamines, as their decomposition products are usually secondary amines, which react in the rubber itself or in the surrounding gas space with nitrosating agents ($NO_x$) to yield stable, carcinogenic N-nitrosamines. Hitherto, only a few accelerators have been known which are not carcinogenic and are adequately soluble in non-polar rubber.

It is already known that soluble (=bloom-free) accelerator mixtures may be obtained with dithiophosphates, but these lead to the formation of carcinogenic N-nitrosamines.

Accelerator mixtures containing short chain alkyldithiophosphates have already been reported, see for example, U.S. Pat. No. 4,306,992 which discusses the prior art use of zinc dibutyl dithiophosphate. The entire disclosure of U.S. Pat. No. 4,306,992, which issued on Dec. 22, 1981, to Schubart et al., is hereby expressly incorporated by reference in the present patent application.

SUMMARY OF THE INVENTION

The object of the invention is to provide accelerator combinations which form no hazardous N-nitrosamines and no or distinctly less toxicologically questionable vulcanizate vapors, which exhibit vulcanization kinetics analogous to standard accelerator systems (e.g., the accelerator systems known in the art including those described in U.S. Pat. No. 4,306,992, cited above) and which yield vulcanizates with physical properties in line with those obtained with standard accelerator systems.

The present invention provides vulcanization accelerator combinations based on di-($C_6$–$C_2$ alkyl)dithiophosphates for vulcanizing non-polar rubbers. In a preferred embodiment of the present invention, the vulcanization accelerator combinations are based on di-($C_8$–$C_2$ alkyl)dithiophosphates.

The vulcanization accelerator combinations of the present invention comprise: (a) a di-($C_6$–$C_2$ alkyl)dithiophosphate; (b) one or more compounds selected from the group consisting of sulphenamides, thiazoles and carbamates; (c) sulfur and/or a sulfur donor; and (d) at least one additional accelerator compound that is not identical to any of the chemical compounds used as components (a) and (b) in a particular accelerator combination. That is, in a particular accelerator combination, component (d) should not have a chemical formula or structure that is identical to the chemical formula or structure of any of the accelerator compounds used as components (a) and (b) of that accelerator combination.

The solubility of the accelerator combinations of the present invention in the non-polar rubber and the vulcanization kinetics of the accelerator combinations of the present invention are improved in comparison to known accelerator systems.

For most applications the di-($C_6$–$C_{12}$ alkyl) dithiophosphates are applied in the form of their zinc salts. As stated earlier, accelerator mixtures containing short chain alkyldithiophosphates (or zinc salts thereof) have already been reported, for example zinc dibutyl dithiophosphate in U.S. Pat. No. 4,306,992. The zinc di-($C_6$–$C_{12}$ alkyl) dithiophosphates according to this invention show alkyl groups from $C_6$ to $C_{12}$ (preferably $C_8$ to $C_{12}$). The advantage of these compounds is that they are liquid caused by the longer alkyl chain (zinc dibutyl dithiophosphate is solid). Especially when used in a non-polar rubber, this is an advantage because the dialkyldithiophosphates of the present invention are more compatible with the rubber mixture. This result lowers the undesired blooming tendency.

In addition, the di-($C_6$–$C_{12}$ alkyl)dithiophosphates of the present invention show lower toxicity compared with dithiophosphates with shorter alkyl chains, for example butyl chains. The di-($C_6$–$C_{12}$ alkyl)dithiophosphates according to this invention are not able to form the cancerogenic N-nitrosamines because they have no secondary-amine fragment in their molecule.

To prepare the accelerator combinations of the present invention, the di-($C_6$–$C_{12}$ alkyl)dithiophosphates may be mixed with per se known compounds, which themselves have an accelerating action, and the action of these mixtures tested with regard to vulcanization kinetics and vulcanization properties. For example, one or more known compounds from the class of substances consisting essentially of sulphenamides, thiazoles and carbamates is selected as a principal accelerator and the optimum quantity ratio of this selected accelerator to the dialkyldithiophosphates is then determined. This mixture is called an accelerator package. In a preferred embodiment of the present invention, the accelerator package can additionally include one or more sulfur donors (e.g., dithiocaprolactam). The accelerator packages of this invention are, as a rule, used together with other known accelerators. However, the other known accelerators (i.e., the accelerator or accelerators that is or are used in addition to the accelerator(s) used in the accelerator package) are different from the accelerator or accelerators used in the accelerator package. For example, although the additional accelerator or accelerators that is or are used in combination with the accelerator package may belong to the same chemical class or family as one of the accelerators used in the accelerator package, the specific chemical structure of the additional accelerator(s) is (are) different from any of the specific accelerators used in the accelerator package of a particular accelerator combination. Specifically, if the accelerator package of a particular accelerator combination contains, for example, a di-($C_6$–$C_{12}$ alkyl)dithiophosphate and a thiazole compound as accelerator compounds, the additional accelerator or accelerators could be compounds that are not from these chemical classes or families (for example, sulphenamides or carbamates) or the additional accelerator or accelerators could be members of the same chemical class or family but have a different chemical structure (e.g., a di-($C_6$–$C_{12}$ alkyl)dithiophosphate amine rather than a di-($C_6$–$C_{12}$ alkyl)dithiophosphate or a thiazole having a different chemical structure than the thiazole used in the accelerator package).

The accelerator packages according to the invention obtained in this manner are incorporated into a crosslinking system consisting of sulfur (and/or a sulfur donor(s)) and accelerator package and tested, varying the quantity ratios of crosslinking agent and accelerator package in order to discover the optimum quantity ratio.

As a result, it is possible to define accelerator packages which, in conjunction with sulfur (and/or a sulfur donor(s)) and at least one additional accelerator, form an accelerator combination which exhibits a slow, medium or fast vulcanization rate. In this manner, it is possible to establish or compare each desired vulcanization characteristic which is achieved by the accelerator combinations with suitably selected standard accelerator systems.

EXAMPLE

Table 1 shows accelerator packages based on sulphenamide (in this case cyclohexylsulphenamide (CBS)). The figures are in parts by weight.

TABLE 1

| Accelerator | AP 1 | AP 2 | AP 3 | AP 4 |
|---|---|---|---|---|
| N-cyclohexyl-2-benzo-thiazole-sulphenamide | 1.92 | 1.92 | 1.92 | 0.96 |
| N-tert.-butyl-2-benzo-thiazole-sulphenamide | — | — | — | 0.96 |
| Dibenzothiazole disulphide | — | 1.28 | 0.96 | 1.28 |
| Zinc di-2-ethylhexyldithio-phosphate | 1.07 | 1.07 | 0.80 | 1.07 |

The accelerator combinations of the present invention are obtained by using these accelerator packages together with sulfur and/or a sulfur donor (e.g., dithiocaprolactam) and a second accelerator as indicated in Table 2. The figures are again in parts by weight. The sulfur used is a polymer bound sulfur containing 80% by weight sulfur and 20% by weight binder (i.e., polymer binder). Similarly, the percentages listed next to the other components indicate the amount of the identified active ingredient in the component. The remainder of each component is a non-active ingredient (e.g., polymer binder).

TABLE 2

| Practical example | 1 | 2 | 3 | 4 |
|---|---|---|---|---|
| Sulfur (80%) | 1.6 | 1.6 | 0.5 | 1.6 |
| Dithiocaprolactam (80%) | — | — | 1 | — |
| Accelerator package (80%) | 4(AP1) | 5.6(AP2) | 4.8(AP3) | 5.6(AP4) |
| Zinc amine di-2-ethylhexyldithio-phosphate (50%) | 2.4 | 2.4 | 1 | 2.4 |

Table 3 shows accelerator packages based on a thiazole. The figures are in parts by weight.

TABLE 3

| Accelerator package | AP 5 | AP 6 |
|---|---|---|
| Dithiocaprolactam | — | 0.88 |
| Dibenzothiazole disulfide | 3.20 | 3.2 |
| Zinc di-2-ethylhexyldithio-phosphate | 0.85 | 0.35 |

These accelerator packages are used together with sulfur and a second accelerator, as shown in Table 4, to obtain the accelerator combinations of the present invention.

TABLE 4

| Example | 5 | 6 |
|---|---|---|
| Sulfur (80%) | 1.2 | 1.4 |
| Accelerator package (80%) | 5.7(AP5) | 5.8(AP6) |
| Zinc diamine di-2-ethylhexyl-dithiophosphate | 2.3 | 2.7 |

In a preferred embodiment of the present invention, the parts by weight for each component listed in Tables 2 and 4 are equivalent to the parts by weight, based on 100 parts by weight of a rubber (or rubber mixture), of each component that would be used in practice to vulcanize the rubber.

The maximum amount of each component in the accelerator combination is that amount which, if exceeded, would cause the component to become insoluble in the rubber (or rubber mixture) and cause blooming (which is exhibited as a film on the surface of the vulcanizate). Blooming disrupts the further processing or working of vulcanizates. The minimum amounts of each component in the accelerator combinations are determined experimentally by the operator depending on his requirements and the rubber (or rubber mixture) that is to be vulcanized. For example, by varying the quantities of the components in the accelerator combinations of the present invention, the operator can obtain accelerator combinations that provide slow, medium or fast vulcanization rates.

While the invention has been particularly shown and described with reference to preferred embodiments thereof, especially in the accelerator combinations of Tables 2 and 4, it will be understood by those skilled in the art that various changes in form and details may be made without departing from the spirit and scope of the invention as defined in the appended claims.

What is claimed is:

1. A vulcanization accelerator combination based on di-($C_6$–$C_{12}$ alkyl)dithiophosphates for vulcanizing nonpolar rubbers, comprising the following components: (a) a di-($C_6$–$C_{12}$ alkyl)dithiophosphate; (b) one or more compounds selected from the group consisting of sulphenamides, thiazoles and carbamates; (c) sulfur and/or a sulfur donor; and (d) at least one additional accelerator compound having a specific chemical structure that is different from the chemical structure of component (a) and any of the compounds used as component (b) in said accelerator combination, wherein said at least one additional accelerator compound is a di-($C_6$–$C_{12}$alkyl)dithiophosphate amine compound or a di-($C_6$–$C_{12}$alkyl)dithiophosphate diamine compound.

2. A vulcanization accelerator combination according to claim 1, wherein said di-($C_6$–$C_{12}$ alkyl)dithiophosphate is a di-($C_8$–$C_{12}$ alkyl)dithiophosphate.

3. A vulcanization accelerator combination according to claim 1, wherein said sulfur donor is dithiocaprolactam.

4. A vulcanization accelerator combination according to claim 1, wherein said at least one additional accelerator is a di-($C_8$–$C_{12}$ alkyl)dithiophosphate amine compound or a di-($C_8$–$C_{12}$ alkyl)dithiophosphate diamine compound.

5. A vulcanization accelerator combination based on di-($C_6$–$C_{12}$ alkyl)dithiophosphates for vulcanizing non-polar rubbers, consisting essentially of the following components: (a) a di-($C_6$–$C_{12}$ alkyl)dithiophosphate; (b) one or more compounds selected from the group consisting of sulphenamides, thiazoles and carbamates; (c) sulfur and/or a sulfur donor; and (d) at least one additional accelerator compound having a specific chemical structure that is different from the chemical structure of component (a) and any of the compounds used as component (b) in said accelerator combination, wherein said at least one additional accelerator compound is a di-($C_6$–$C_{12}$ alkyl)dithiophosphate amine compound or a di-($C_6$–$C_{12}$ alkyl)dithiophosphate diamine compound.

6. A vulcanization accelerator combination according to claim 5, wherein said di-($C_6$–$C_{12}$ alkyl)dithiophosphate is a di-($C_8$–$C_{12}$ alkyl) dithiophosphate.

7. A vulcanization accelerator combination according to claim 5, wherein said sulfur donor is dithiocaprolactam.

8. A vulcanization accelerator combination according to claim 6, wherein said at least one additional accelerator is a di-($C_8$–$C_{12}$ alkyl)dithiophosphate amine compound or a di-($C_8$–$C_{12}$ alkyl)dithiophosphate diamine compound.

9. A vulcanization accelerator combination based on di-($C_6$–$C_{12}$ alkyl)dithiophosphates for vulcanizing non-polar rubbers, consisting of: (a) a di-($C_6$–$C_{12}$ alkyl) dithiophosphate; (b) one or more compounds selected from the group consisting of sulphenamides, thiazoles and carbamates; (c) sulfur and/or a sulfur donor; and (d) at least one additional accelerator compound having a specific chemical structure that is different from the chemical structure of component (a) and any of the compounds used as component (b) in said accelerator combination, wherein said at least one additional accelerator compound is a di-($C_6$–$C_{12}$ alkyl)dithiophosphate amine compound or a di-($C_6$–$C_{12}$ alkyl)dithiophosphate diamine compound.

10. A vulcanization accelerator combination according to claim 9, wherein said di-($C_6$–$C_{12}$ alkyl)dithiophosphate is a di-($C_8$–$C_{12}$ alkyl) dithiophosphate.

11. A vulcanization accelerator combination according to claim 9, wherein said sulfur donor is dithiocaprolactam.

12. A vulcanization accelerator combination according to claim 9, wherein said at least one additional accelerator is a di-($C_8$–$C_{12}$ alkyl)dithiophosphate amine compound or a di-($C_8$–$C_{12}$ alkyl)dithiophosphate diamine compound.

13. A vulcanization accelerator combination according to claim 1, wherein component (b) consists of a sulphenamide compound, component (c) consists of sulfur and component (d) consists of a zinc salt of a di-($C_6$–$C_{12}$ alkyl) dithiophosphate amine compound.

14. A vulcanization accelerator combination according to claim 1, wherein component (b) consists of one or more thiazole compounds, component (c) consists of sulfur and a sulfur donor and component (d) consists of a zinc salt of a di-($C_6$–$C_{12}$ alkyl)dithiophosphate diamine compound.

15. A vulcanization accelerator combination according to claim 1, wherein component (b) consists of two different sulphenamide compounds and a thiazole compound, component (c) consists of sulfur, and component (d) consists of a zinc salt of a di-($C_6$–$C_{12}$ alkyl)dithiophosphate amine compound.

16. A vulcanization accelerator combination according to claim 1, wherein component (b) consists of a sulphenamide compound and a thiazole compound, component (c) consists of sulfur and a sulfur donor, and component (d) consists of a zinc salt of a di-($C_6$–$C_{12}$ alkyl)dithiophosphate amine compound.

17. A vulcanization accelerator combination according to claim 1, wherein component (b) consists of a sulphenamide compound and a thiazole compound, component (c) consists of sulfur, and component (d) consists of a zinc salt of a di-($C_6$–$C_{12}$ alkyl)dithiophosphate amine compound.

18. A vulcanization accelerator combination according to claim 1, wherein said di-($C_6$–$C_{12}$ alkyl)dithiophosphate is a di-($C_8$–$C_{12}$ alkyl)dithiophosphate and said sulfur donor is dithiocaprolactam.

* * * * *

UNITED STATES PATENT AND TRADEMARK OFFICE
CERTIFICATE OF CORRECTION

PATENT NO. : 5,830,817

DATED : November 3, 1998

INVENTOR(S) : Graf et al.

It is certified that error appears in the above-identified patent and that said Letters Patent is hereby corrected as shown below:

In the Claims, column 5, claim 8, the reference to "claim 6" should be changed to --claim 5--.

Signed and Sealed this

Tenth Day of April, 2001

Attest:

NICHOLAS P. GODICI

*Attesting Officer*  *Acting Director of the United States Patent and Trademark Office*